United States Patent
Ramezani

(10) Patent No.: US 12,128,721 B2
(45) Date of Patent: Oct. 29, 2024

(54) MORPHO-FUNCTIONAL ROBOTS WITH LEGGED AND AERIAL MODES OF LOCOMOTION

(71) Applicant: Northeastern University, Boston, MA (US)

(72) Inventor: Alireza Ramezani, Pawtucket, RI (US)

(73) Assignee: Northeastern University, Boston, MA (US)

( * ) Notice: Subject to any disclaimer, the term of this patent is extended or adjusted under 35 U.S.C. 154(b) by 164 days.

(21) Appl. No.: 17/777,743

(22) PCT Filed: Nov. 23, 2020

(86) PCT No.: PCT/US2020/061772
§ 371 (c)(1),
(2) Date: May 18, 2022

(87) PCT Pub. No.: WO2021/102402
PCT Pub. Date: May 27, 2021

(65) Prior Publication Data
US 2023/0001757 A1 Jan. 5, 2023

Related U.S. Application Data

(60) Provisional application No. 62/939,152, filed on Nov. 22, 2019.

(51) Int. Cl.
*B60F 5/02* (2006.01)
*B33Y 80/00* (2015.01)
(Continued)

(52) U.S. Cl.
CPC ............ *B60F 5/02* (2013.01); *B33Y 80/00* (2014.12); *B64C 25/32* (2013.01); *B64C 37/00* (2013.01);
(Continued)

(58) Field of Classification Search
CPC . B60F 5/02; B33Y 80/00; B64C 25/32; B64C 37/00; B64C 39/024;
(Continued)

(56) References Cited

U.S. PATENT DOCUMENTS 2,918,738 A * 12/1959 Barr ................. B62D 57/00
280/1.181
4,527,650 A * 7/1985 Bartholet ........... B62D 57/032
901/1
(Continued)

FOREIGN PATENT DOCUMENTS

WO WO-2021/102402 A1 5/2021

OTHER PUBLICATIONS

International Search Report and Written Opinion for International Application No. PCT/US2020/061772 mailed Mar. 30, 2021.

*Primary Examiner* — Medhat Badawi
(74) *Attorney, Agent, or Firm* — Foley Hoag LLP

(57) ABSTRACT

A multi-modal robot capable of legged and aerial locomotion includes a body structure including a plurality of legs, each leg having at least one joint; a plurality of thrusters connected to the body structure; and a plurality of actuators for controlled movement of the legs and thrusters. The plurality of actuators are embedded within composite housing structures in the body structure. The composite housing structures are formed by additive printing of composite material over components of the actuators. The composite housing structures are reinforced by layers of continuous carbon fiber material. A method of constructing an actuator for use in a multi-modal robot is also disclosed. Additionally, a computer-implemented method is disclosed to identify particular locations and sizes of components in multi-modal robots providing the lowest total cost of transport.

8 Claims, 17 Drawing Sheets

(51) Int. Cl.
  *B64C 25/32* (2006.01)
  *B64C 37/00* (2006.01)
  *B64U 30/20* (2023.01)
  *B64U 10/13* (2023.01)
  *B64U 10/70* (2023.01)
(52) U.S. Cl.
  CPC .............. *B64U 30/20* (2023.01); *B64U 10/13* (2023.01); *B64U 10/70* (2023.01)
(58) Field of Classification Search
  CPC .. B64C 2025/325; B64U 30/20; B64U 10/13; B64U 10/70; B62D 57/032
  See application file for complete search history.

(56) References Cited

U.S. PATENT DOCUMENTS

| | | | | |
|---|---|---|---|---|
| 4,738,583 A * | 4/1988 | Macconochie | ........ | B62D 57/02 901/33 |
| 6,588,701 B2 * | 7/2003 | Yavnai | ................... | B64U 60/20 244/23 B |
| 6,652,352 B1 * | 11/2003 | MacArthur | ......... | A63H 11/205 446/457 |
| 6,974,356 B2 * | 12/2005 | Hobson | .................. | E02F 5/006 244/22 |
| 7,938,708 B2 * | 5/2011 | Willet | .................. | A63H 11/205 446/330 |
| 8,657,042 B2 * | 2/2014 | Mantzel | ................ | A63H 11/20 180/8.5 |
| 10,254,499 B1 * | 4/2019 | Cohen | .................. | B29C 64/321 |
| 10,899,402 B2 * | 1/2021 | Sun | ...................... | G05D 1/0246 |
| 11,427,319 B2 * | 8/2022 | Deng | .................... | B64U 10/14 |
| 2013/0269585 A1 * | 10/2013 | Kim | ...................... | B62D 57/032 114/337 |
| 2014/0339355 A1 * | 11/2014 | Olm | ...................... | B64U 30/291 244/17.23 |
| 2015/0051710 A1 * | 2/2015 | Herr | ........................ | A61F 2/66 623/27 |
| 2015/0274294 A1 * | 10/2015 | Dahlstrom | ............ | E04G 23/002 239/722 |
| 2016/0130000 A1 * | 5/2016 | Rimanelli | .............. | B64U 10/70 244/2 |
| 2017/0097021 A1 * | 4/2017 | Ilievski | .................. | B25J 9/1075 |
| 2017/0136697 A1 * | 5/2017 | Kia | ...................... | B29C 64/165 |
| 2017/0368739 A1 * | 12/2017 | Brennan | .............. | B29C 64/386 |
| 2018/0071949 A1 * | 3/2018 | Giles | ...................... | B28B 1/001 |
| 2018/0172121 A1 * | 6/2018 | Potter | .................... | B25J 9/102 |
| 2018/0312023 A1 * | 11/2018 | Braithwaite | ............. | B60F 5/02 |
| 2019/0192821 A1 * | 6/2019 | Nakata | ............ | A61M 25/0155 |
| 2019/0299522 A1 * | 10/2019 | Chapiro | .................. | B29C 70/38 |
| 2021/0107177 A1 * | 4/2021 | Giles | ........................ | E04B 1/35 |
| 2023/0001757 A1 * | 1/2023 | Ramezani | .............. | B64C 25/32 |

* cited by examiner

A) Morphing from legged to UAS configuration

B) Aerial configuration

MORPHO-FUNCTIONAL ROBOTS WITH LEGGED AND AERIAL MODES OF LOCOMOTION

CROSS REFERENCE TO RELATED APPLICATIONS

This application is a national phase entry under 35 USC § 371 of International Application No. PCT/US20/61772 filed Nov. 23, 2020 entitled MORPHO-FUNCTIONAL ROBOTS WITH LEGGED AND AERIAL MODES OF LOCOMOTION, which claims priority from U.S. Provisional Patent Application No. 62/939,152 filed on Nov. 22, 2019 entitled MORPHO-FUNCTIONAL ROBOTS WITH LEGGED AND AERIAL MODES OF LOCOMOTION. The entire contents of these applications are incorporated herein by reference in their entirety.

BACKGROUND

The present application relates generally to legged-aerial morpho-functional robots with boosted capabilities through thruster-assisted locomotion, which allows the robots to negotiate unstructured environments, including land and air, by leveraging their legs and thrusters collaboratively. These robots can be used in a broad range of applications, including search and rescue operations, space exploration, automated package handling in residential spaces, and agricultural operations, to name a few. In all of these examples, the unique capability of thruster-assisted mobility greatly broadens the locomotion designs possibilities for these systems.

BRIEF SUMMARY OF THE DISCLOSURE

A multi-modal robot capable of legged and aerial locomotion is disclosed in accordance with one or more embodiments. The robot includes a body structure including a plurality of legs, each leg having at least one joint; a plurality of thrusters connected to the body structure; and a plurality of actuators for controlled movement of the legs and thrusters. The plurality of actuators are embedded within composite housing structures in the body structure. The composite housing structures are formed by additive printing of composite material over components of the actuators. The composite housing structures are reinforced by layers of continuous carbon fiber material.

A method of constructing an actuator for use in a multi-modal robot capable of legged and aerial locomotion is disclosed in one or more further embodiments. The multi-modal robot comprises a body structure including a plurality of legs and thrusters connected to the body structure. The actuators control movement of the legs and thrusters during operation of the multi-modal robot. The method includes the steps of: (a) performing additive printing of composite material over components of the actuators to form composite housing structures around the components; (b) reinforcing the composite housing structures with layers of continuous carbon fiber material around the composite housing structures; and (c) assembling additional components of the actuators with the components in the composite housing structures to form the actuators for the multi-modal robot.

A computer-implemented method in accordance with one or more further embodiments includes the steps of: (a) generating a parametrized model of a multi-modal robot capable of legged and aerial locomotion, wherein locations and sizes of given components of the robot are tunable parameters; (b) applying generative design algorithms using the parametrized model to create a robot design space, the design space including a plurality of robot designs having varying locations and sizes of the given components of the robot; (c) using an optimization tool to identify a given robot design in the robot design space having particular locations and sizes of components providing the lowest total cost of transport; and (d) outputting the given robot design for use in constructing a multi-modal robot.

DETAILED DESCRIPTION

Various embodiments disclosed herein relate to the design of morpho-functional robots that integrate two forms of mobility, aerial and legged (e.g., quadrupedal legged) locomotion, within a single platform. There are prohibitive design restrictions such as a tight power budget and payload, which is particularly important in aerial flights. To address these challenges, we pose a problem called the Mobility Value of Added Mass (MVAM) problem. In the MVAM problem, we attempt to allocate mass in robot designs such that the energetic performance is affected the least. To solve the MVAM problem, we adopted a generative design approach using the Grasshopper generative design tool's evolutionary solver to synthesize a parametric design space for the robot. Then, this space was searched for the morphologies that could yield a minimized Total Cost of Transport (TCOT) and payload. This approach revealed that a front heavy quadrupedal robot can achieve a lower TCOT while retaining larger margins on allowable added mass to its design.

While energetic efficiency of legged locomotion has been extensively studied based on shaping joint trajectory [2], actuator design [3], [4] and compliance [5], [6], there has been little to no attempt to connect it to robot morphology. For instance, efficiency was a key factor in the MIT Cheetah robot's trotting gaits with jerky and interrupted joint movements under large Ground Reaction Forces (GRFs) [7]. Efficiency was achieved based on electric actuator design and selection of predefined trotting gaits. Since commercial actuators with high ratio gearboxes are often tightly designed based on more continuous and controlled behaviors, the Cheetah possessed back-drivable and brushless actuators.

In ANYmal, the emphasis has been on endurance and with its bulky structure, so natural and fast running patterns showcased by MIT's Cheetah are not feasible on this platform [8]. ANYmal's design characteristics are high torque joint actuation through the combination of electric motors and harmonic drives with rotational springs, precision joint movement measurement, and a rigid, bulky leg structure that accommodate high mechanical bandwidth for high bandwidth impedance control. With these characteristics, robot morphology and payload have not been important in the design of ANYmal.

Figure 1:
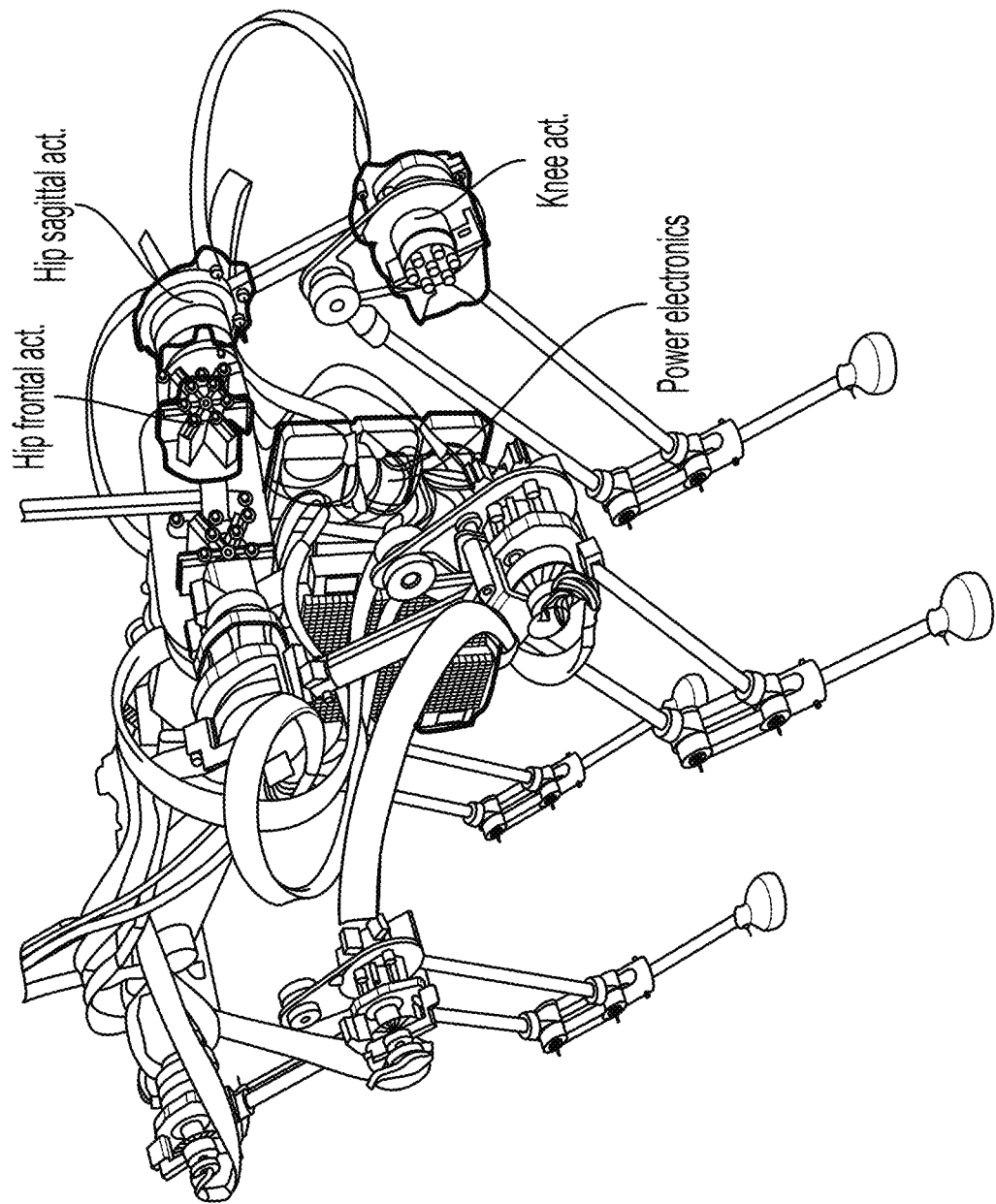
FIG. 1 illustrates an exemplary morpho-functional robot in accordance with one or more embodiments in a legged mode of operation.
Figure 2B:
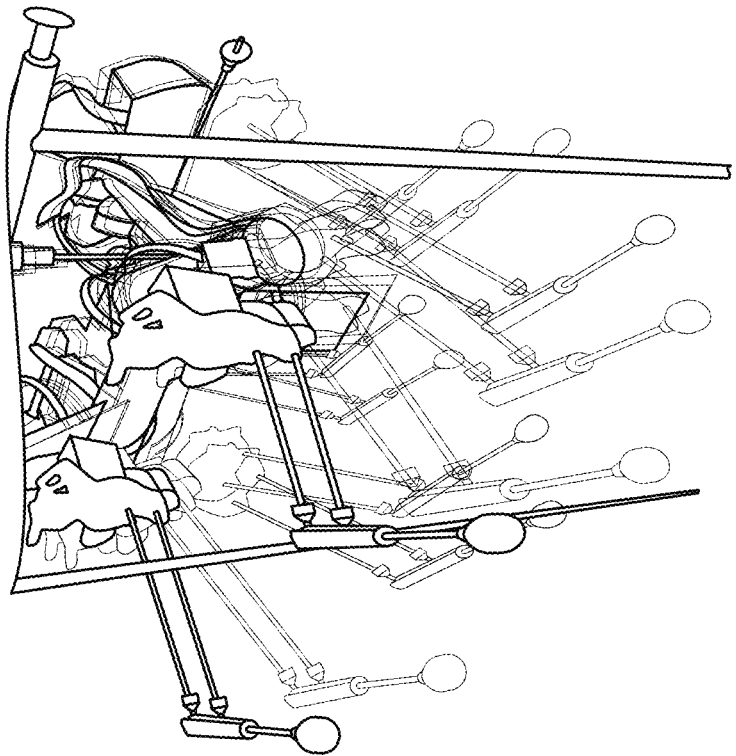
FIG. 2B illustrates the robot of FIG. 1 morphing from legged to aerial modes of operation.
Figure 2A:
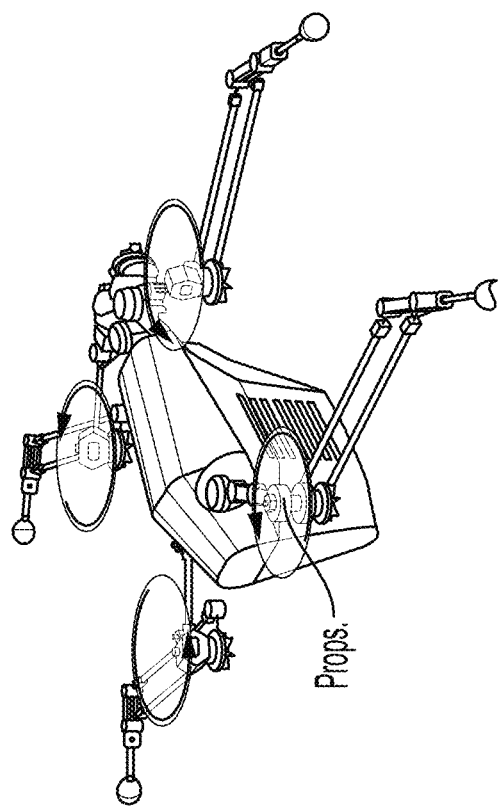
FIG. 2A illustrates the robot of FIG. 1 in an aerial mode of operation.

FIG. 1 illustrates one example of a morpho-functional robot in accordance with one or more embodiments called the Husky Carbon robot in a legged mode of operation. Husky Carbon, when standing as a quadrupedal robot, is 2.5 ft. (0.8 m) tall. The robot is about 1 ft. (0.3 m) wide. It is fabricated from reinforced thermoplastic materials through additive manufacturing and weighs 9.5 lbs. (4.3 kg). It hosts on-board power electronics and a power supply. The robot optionally includes exteroceptive sensors such as camera and LiDAR. The robot is constructed of two pairs of identical legs in the form of parallelogram mechanisms. Each with three degrees-of-freedom (DOFs), the legs are fixated to Husky's torso by a one-DOF revolute joint with a large range of motion. As a result, the legs can be located sideways as shown in FIGS. 2A and 2B. This configuration allows facing the knee actuators upwards for propulsion purpose. A clutch mechanism can disengage the knee actuator from the lower limb before the actuator runs a propeller.

The robot has 12 actuators. Each custom-made actuator has a pancake brushless-DC motor winding from T-motor with a KV equal to 400. Harmonic drive component sets (flexspline, circular spline, and wave generator) with gear ratios: 30, 50 and 100 for knee, hip sagittal and hip frontal, respectively, and hall-effect-based incremental encoders are embedded inside the 3D-printed structure of the robot. The embedding process, which will be discussed in further detail below, reduces the use of metal housings and fasteners to produce a lighter structure. The robot includes an on-board inertial measurement unit for orientation sensing.

Significant design restrictions such as payload and actuation power exist in the design of morpho-functional robots. By looking at legged locomotion as the translation of the center of mass (COM) of the robot in the environment led by body self-manipulation, it is apparent that added mass from structures, actuators, electronics, etc., can yield added required actuation torques at the joints and have to be compensated by stronger and larger actuators, which in turn add extra mass to the system. So, the resulting loop of added mass for the added required joint torque can lead to bulky systems. This issue becomes very important when aerial mobility is considered as, e.g., the application of metal parts or bulky actuators that are widely used in legged robots is no longer possible. That said, the use of lighter non-metallic structures, unreinforced body frameworks, smaller actuators, etc., can manifest itself in destructive ways such as unplanned compliance or lack of actuation power in the system.

Compliance can yield control design challenges both for aerial and legged mobility. In general, whole body control in legged systems is challenging by itself and unplanned compliance can lead to extra challenges such as poor foot placement performance [10], [11]. That said, compliance is not a negative property by itself and is the defining characteristics of biological locomotion systems [9]. This is the reason legged community has adopted series elastic actuators [12], [13].

The inherent compliance in Husky's body has led to a few issues that have been addressed with the help of closed-loop feedback. While Husky's compliant legs can potentially accommodate locomotion on grounds that feature unknown irregularities, body flexibility in Husky can prohibit precise kinematic planning for perceived ground changes and can lead to instantaneous body sagging each time feet touchdowns occur. Other issues include degraded mechanical bandwidth as it is important to the projection of joint torques to body forces, impedance control, or foot placement. For instance, the leg compliance can introduce oscillations of large amplitude and can lower the natural frequency of the tracking controller meant to position the COM at desired locations with respect to the contact points [14], [15], [13], [16], [10].

Quadrupedal robots are often designed in such a way that they have wide support polygons, which allow trivial, quasi-static locomotion [16], [17], [11], [11]. Husky possesses a very small stability margin based on a crude definition [18] that considers the shortest distance from the robot's projected COM to the edges of its support polygon constructed by the contact points. This small margin exists for two reasons. First, the small stability margin is caused partly because of a low cross-section torso, i.e., the hips are located very close to each other in the frontal plane, which is important to reduce induced drag forces for aerial mobility. Second, it is partly caused by the inherent compliance in the system, which can cause fall-overs even when the robot has four contact points. Due to the robot body flexibility COM can shift towards the edges of the support polygon very easily if required corrections are not made quickly through foot placement or active control of the joints.

Small stability margins in Husky has led to other challenges such as gait design issues that generally are expected in bipedal systems and not quadrupedal robots [19]. In Husky, the stability margin and gait cycle periods are adversely related. When the gait cycle time is larger than approximately one third of a second, which is equivalent to a 3-Hz gait cycle, even when the robot retains three contact points with the ground surface the projected position of the robot COM could reach to the boundaries of the support polygon. If new foot placements are not involved, the robot's stability margin will reduce further by the sagging effects led by the compliance in the robot. This poses severe gait design challenges.

Mobility Value of Added Mass (MVAM) Problem

Added mass can affect various aspects of mobility in a mobile robot, e.g., in legged systems, it can affect impact dynamics, energetic efficiency, selection of actuators, etc. It is nearly impossible to consider every aspect of mobility when dealing with a mass allocation problem. We only consider the connection between morphology and energetic efficiency of legged mobility, which has direct implications in the design of Husky. We call this problem Mobility Value of Added Mass (MVAM). While aerial mobility is another important objective in this project, the MVAM problem only addresses payload restrictions in relation to it.

Inspection of energetic efficiency of legged robots is not a new topic and has been extensively studied and various key players such as joint movement, actuator design, and compliance have been examined. However, there has been little to no attempt to connect efficiency to robot morphology. In pursuit of a multi-modal design that can realize legged and aerial mobility, actuation and payload pose formidable challenges. We studied how Husky's morphology can affect its Total Cost of Transport (TCOT). The MVAM problem addresses how the search for a morphology with minimum TCOT and payload can be mathematically formulated.

To do this, we drew a connection between generative design algorithms such as those available in Rhino and physics modeling tools from MATLAB. Using Grasshopper, which is a plugin for the Rhino 6 CAD software, we were able to create a parametric model of the entire robot. The parameters including the location of metal parts (e.g., components of harmonic drives) and electronics within body structures, the size of housings, body frame, connecting rods, etc., were made accessible to a Galapagos, an evolutionary solver within Grasshopper, which was allowed to automatically find the overall design space based on any other components that were included in the model. The resulting design space can reflect important aspects including geometry, inertial properties, structural strength and kinematics of the physical model realistically. Tweaks to the geometry of the robot can also be made by the solver. Then, we linked this space to the parametric constrained dynamical model of Husky in MATLAB.

Figure 4:
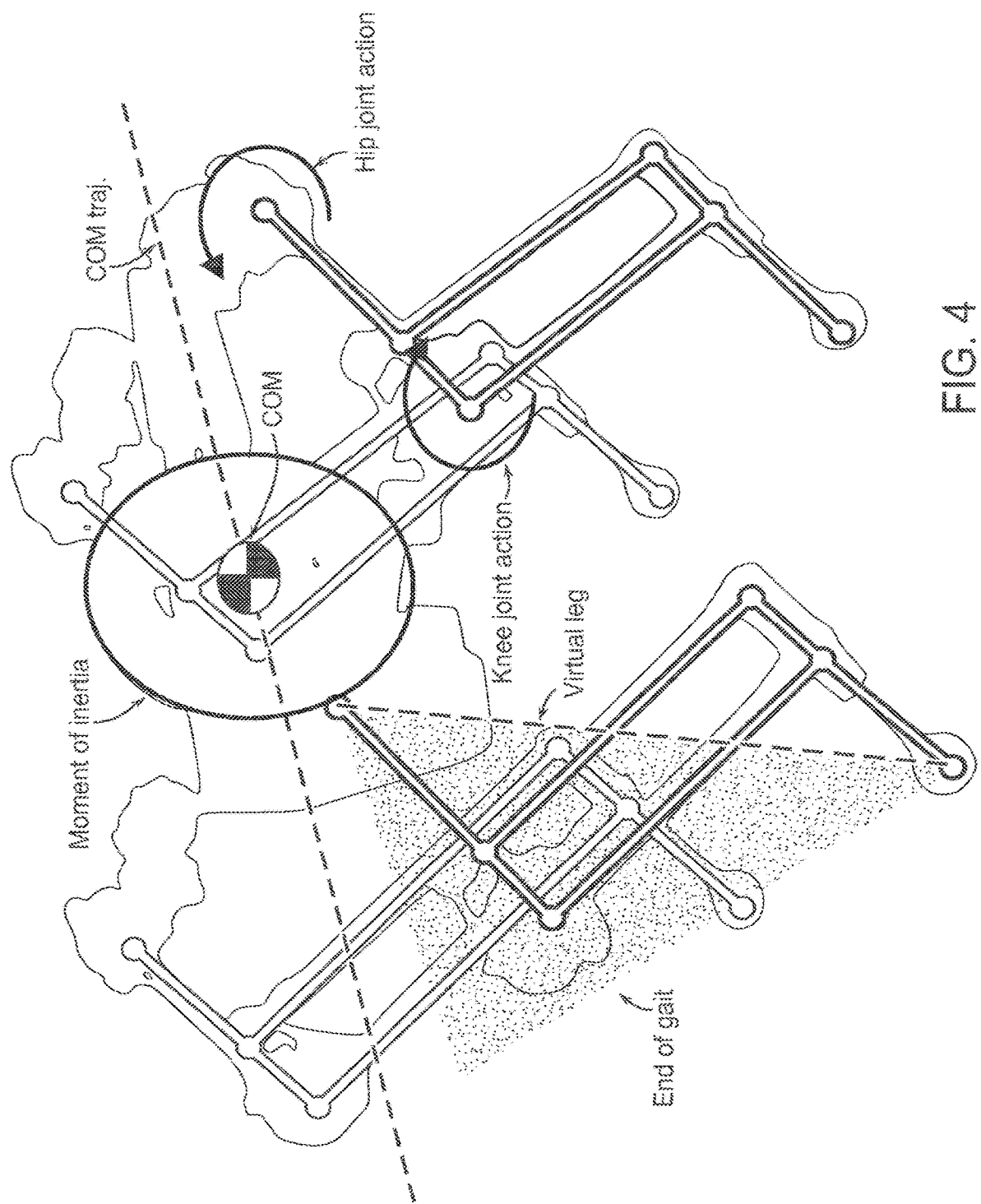
FIG. 4 illustrates a constraint enforced on the robot's COM for forward walking so all morphologies exhibit a similar gait pattern.

Since finding a closed-form solution of TCOT in terms of morphology (i.e., components location, shape and size) is not feasible, we considered the numerical model of Husky in MATLAB. In this model, inertial properties including the COM position and principal mass moment of inertia are introduced as decision parameters that are set by a finite state nonlinear optimizer in MATLAB. The model is constrained in its sagittal and frontal planes of walking (shown in FIG. 4). No motion in the frontal plane of locomotion is allowed. In the sagittal plane, all joints movements are forced to follow feasible, predefined trajectories. These predefined trajectories described forward walking gaits in our robot. Contrary to trajectory optimization that assumes a fixed robot morphology, here, fixed gaits and trajectories are assumed and instead the robot morphology is changed.

The overall search problem can be written for i=1, ... n, where n is the number of morphologies involved, as following:

$$\min_{m_i \in M} \int_0^{t_f} TCOT(m_i, t, x(t), u(t))$$

subject to:

$$\dot{x}(t) = f_i(m_i, t, x(t), u(t))$$

$$y = h(x(t))$$

where $m_i \in M$ is the space of all possible designs and morphologies. Gait time period, state and joint torque vectors are denoted by $t_f$, $x(t)$ and $u(t)$, respectively. The dynamics for each morphology are denoted by $f_i(.)$ and $h(x(t))$ denotes the constraints (dashed black line in FIG. 4) enforced to the models to ensure all follow a similar gait pattern (i.e., forward walking).

Additive Manufacturing and Embedding Components

Consumables applied in the metal housing in standard actuators and other supporting components are considered as the bulk of mass in legged robots. Actuators compensate major external loads and any design flaw would lead to the concentration of forces internally and consequently yield failures. As a result, designers aim at higher safety factors and often achieve extra hardware security through massive metal housing and support parts.

To avoid the problem, the fabrication of Husky took place based on embedding electronics and mechanical components precisely at the locations found by MVAM problem. We applied a MarkForged 3D printer in this section. For instance, the steps involved at embedding a harmonic drive's component sets are discussed in further detail below. In this process, circular splines are embedded inside the actuator housings and other components including wave generators and flexsplines are embedded at the subsequent steps. Embedding components within 3D printed structures and linking this approach to a physics-based generative design method (MVAM problem) and the use of the results directly to create a legged robot with many parts and components is unprecedented and has not reported before.

The benefits of this approach are as following. First, a considerable payload reduction can be achieved for a feasible and working platform. Second, system components can be precisely located at predetermined locations dictated by the MVAM solutions, which are aimed at enhancing efficiency and reduce payload. Finally, the model and robot can be matched better, which is important for model-based control design. Therefore, morphology and its role in control can be taken into account. We incorporated classical actuator models in our MVAM problem to determine actuation requirements. The findings can be used to select DC motor windings and harmonic drives.

To minimize added mass over yield strength ratio, we applied a simple approach. To increase the stiffness of light 3D printed parts, we applied a method that has roots in classical beam theory. One can increase stiffness of beam by increasing the moment of inertia of the beam section or the modulus elasticity of the material. In our case it was more feasible, from a design perspective, to increase the moment of inertia because we wanted to avoid using heavy metals with a considerably higher modulus. By sandwiching 3D-printed thermoplastic material between layers of continuous carbon fiber, weight is reduced while stiffness was greatly increased. This was achieved using MarkForged slicer application called Eiger.

Figure 3:
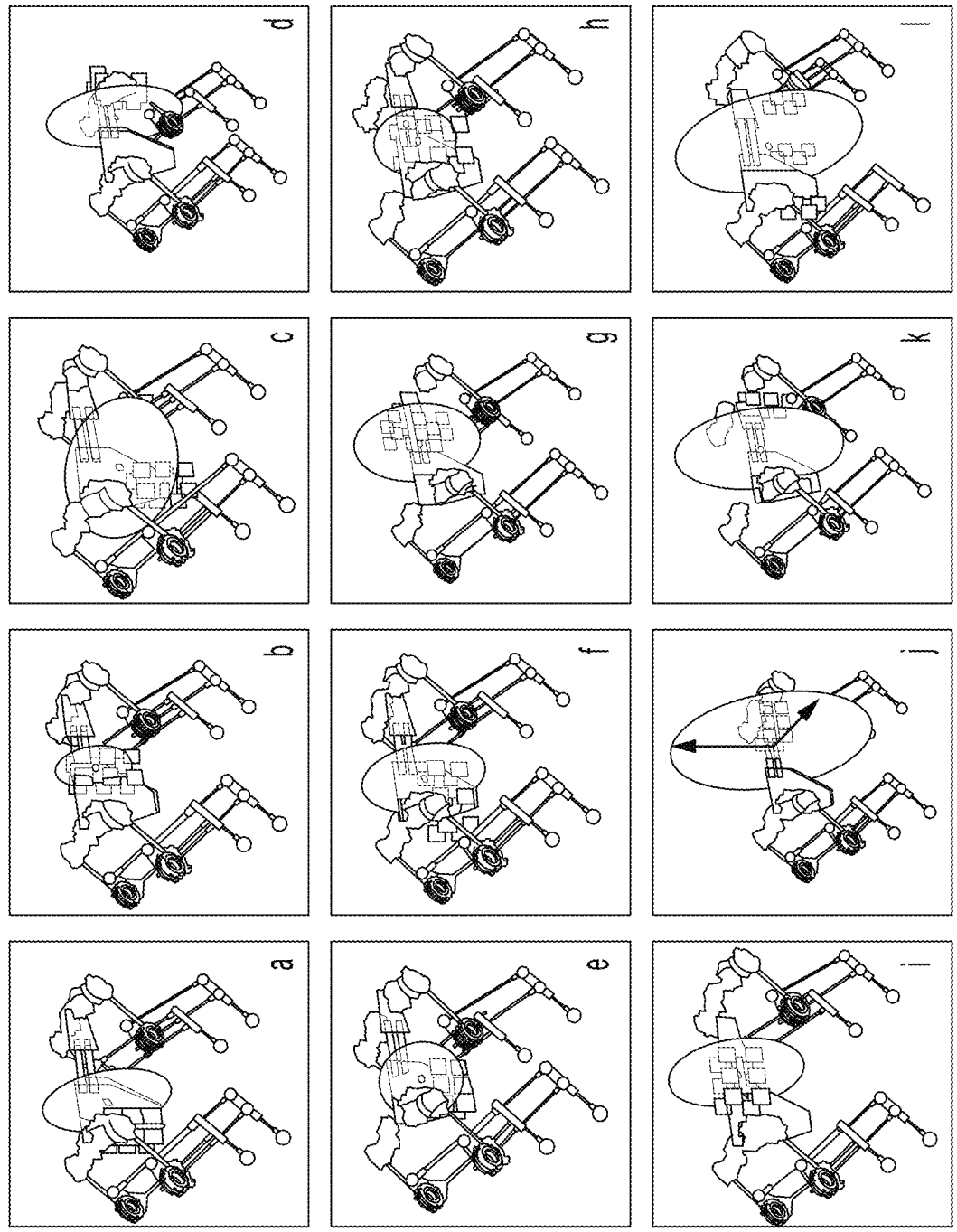
FIG. 3 illustrates a part of an exemplary design space led by a computer-aided, generative design algorithm in accordance with one or more embodiments. A parametric model and an evolutionary solver describe the design space, which is linked to a parametric physics model. Various morphologies based on components locations, sizes, and shapes are searched for a minimized Total Cost of Transport (TCOT) and payload.
Figures 5A, 5B:
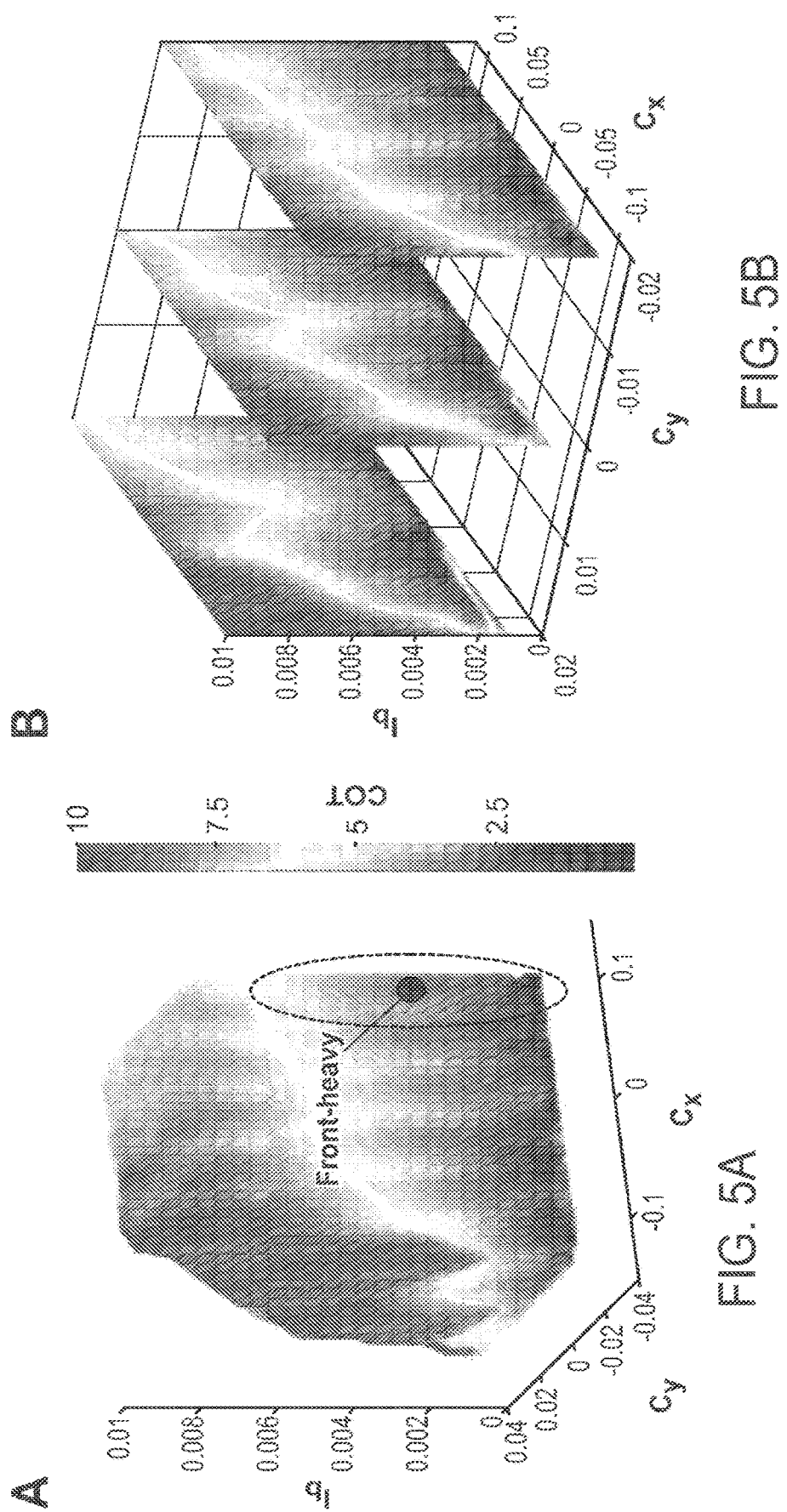
FIG. 5A Illustrates TCOT values for an entire generated design space represented in terms of the density and color of the data points.
FIG. 5B illustrates cross-sections of the design space depicted in FIG. 5A.

In FIG. 5A, TCOT values are computed for all of the morphologies in the design space and are represented by the color and intensity of the data points. The low TCOT regions are indicated by the blue and light blue areas. For ease in discussing the results, we will categorize the design space— some examples from the design space are shown in FIG. 3—led by the generative algorithm into front or back heavy and top or bottom heavy solutions which refer to $C_x$ and $C_y$ positions relative to the geometric center of the robot. The mass moment of inertia at the COM in the sagittal plane is denoted by lb. To show how the design space is characterized by TCOT, we took cross-sections of our data set, shown in FIG. 5B. While front or back heavy solutions are significantly different in terms of TCOT, top and bottom heavy morphologies have little to no effect on the efficiency metric. In FIG. 5B, each cross-section in the $C_y$ direction show generally the same trend.

In forward walking, we have found that hosting larger added mass in a front heavy morphology is less costly. In other words, one can see FIG. 5A for a front heavy morphology, lower TCOT can be achieved while larger margins—or upper bounds—on the mass moment of inertia in the sagittal plane of locomotion are retained. This finding led us to select a front heavy morphology. We note that since pre-defined, forward walking gaits are considered in this design process the results and conclusions can be biased. That said, we made the design decision to keep the scope of this problem limited.

Figure 6:
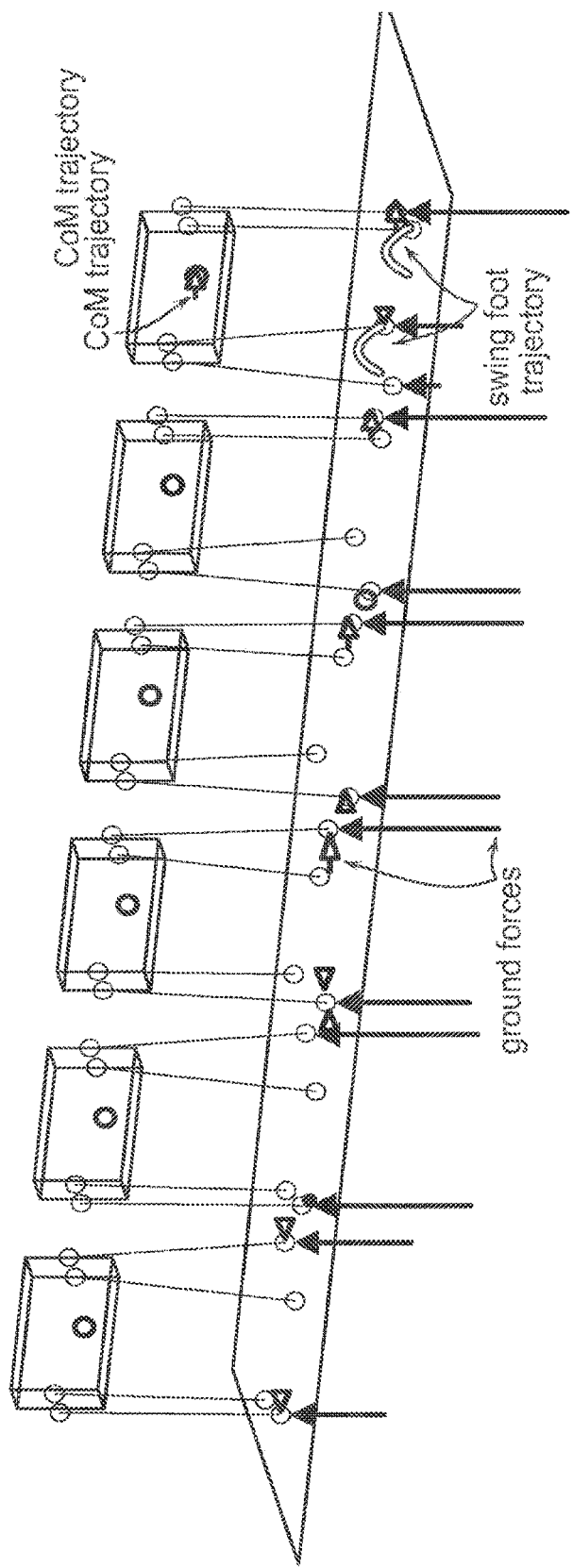
FIG. 6 is a stick-diagram illustrating closed-loop forward walking results of a robot with front heavy morphology.
Figure 7:
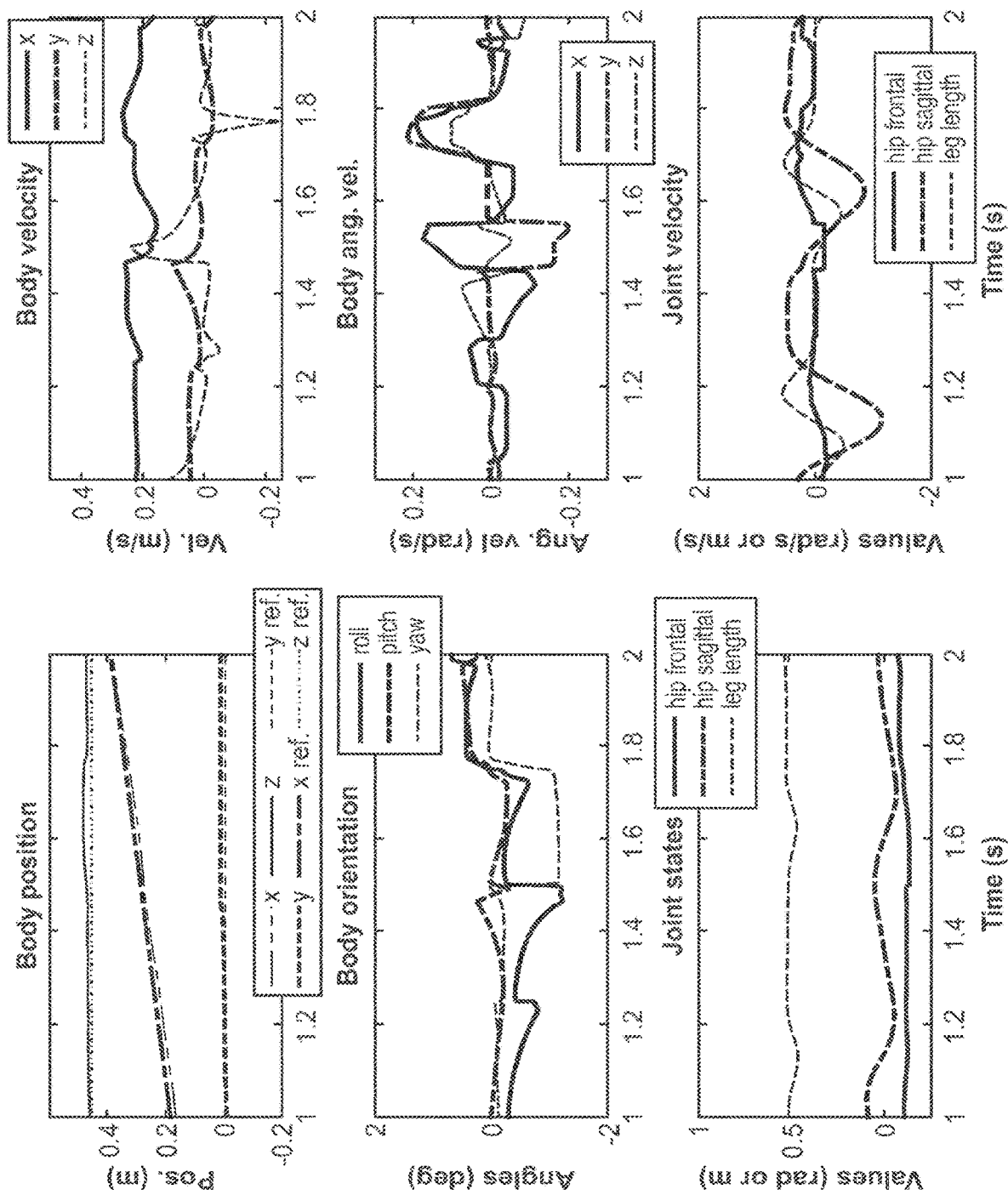
FIG. 7 shows graphs illustrating simulated state-space variables for a forward walking robot.

Preliminary untethered trotting results were obtained using the front heavy morphology where OptiTrack was used to estimate the position and orientation of the robot. We predicted the TCOT in simulation. Simulation results for multiple steps using the unconstrained, front heavy model of Husky were obtained. In this simulation, the lower legs are modeled to be massless and the foot-end positions are defined using leg length and hip angles. FIGS. 6 and 7 illustrate the simulation results for forward walking at a rate of 0.2 m/s and gait period of 0.25 s. This gait is stabilized using a whole body control design approach and has a TCOT equal to 0.2.

Fabrication Process

The embedding of components inside composite material structures enables the fabrication of ultra-light and robust actuators, maintaining power density comparable to robots of similar size. Additionally, the embedding of components within composite structures yields a robot design with (i) greatly reduced conventional fasteners that mechanically join or affix multiple objects together and (ii) a greatly reduced number of metal components. While conventional metal parts and fasteners are widely used to create the structure of mobile robots, in robot designs in accordance with various embodiments, composite materials are applied yielding ultra-light robots comparable with conventional system in size and power density.

The process manufacturing robots in accordance with one or more embodiments involves embedding metal components inside composite structures in such a way that a significant payload reduction is achieved. Consumables applied in the metal housing in standard actuators and other supporting components are considered as the bulk of mass in legged robots. Actuators compensate major external loads and any design flaw would lead to the concentration of forces internally and consequently yields failures. As a result, designers aim at higher safety factors and often achieve extra hardware security through massive metal housing and support parts. Since payload plays an important role in the design, we consider a design approach wherein composite material are located at desired and predefined locations in a controlled fashion and in close relationship to the nature of internal and external forces. In this process, we identify vulnerable design components and leverage state-of-the-art additive manufacturing fabrication with inlay carbon fiber reinforcement to fortify bottle-necks.

A. Flexural Rigidity of Composite Beam

Generally, robot components undertake massive bending moments that yield high internal shear forces. A simple approach to increase the stiffness that has roots in classical beam theory suggests that one could increase the moment of inertia of the beam section or increase its modulus elasticity of the material. Nevertheless, in most cases it will be easier, from a design perspective, to increase the moment of inertia, because it is usually difficult and expensive to provide a material with considerably higher modulus. For instance, for a rectangular section, moment of inertia will increase when one increases the depth or width of the beam. For a typical beam, where most of the stiffness needed is about horizontal axis, one could make the beam deeper and this will significantly increase the stiffness, compared to the width of the beam section.

The flexural rigidity of a composite beam with a thick core and two thin faces can be calculated with the following equation:

$$(EI)_{eq} = E_c \frac{bc^3}{12} + E_f \frac{bt^3}{12} \times 2 + E_j bt \left(\frac{ct}{2}\right)^2 \times 2$$

$E_f$ and $E_c$ are the Young's moduli of the faces and core of the beam respectively, t and c are the thickness of the outer faces and core respectively, and b is width of the beam. The $$\frac{bc^3}{12}$$

term represents the moment or inertia of the core of the beam about the neutral axis. The $$E_f \frac{bt^3}{12}$$

term represents the moment of inertia of one of the faces of the beam about its own centroidal axis. Using the parallel axis theorem, the addition of the $$E_j bt \left(\frac{ct}{2}\right)^2$$

term translates the moment of inertia about the centroid of the face to the neutral axis of the beam. These two face terms are both multiplied by two due to the two outer faces. This equation simplifies to:

$$(EI)_{eg} = \frac{E_c bc^3}{12} + \frac{E_f bt^3}{6} + \frac{E_f bt}{2}(c+t)^2$$

Typically, $E_j >> E_c$ and $c >> 1$

Figure 8:
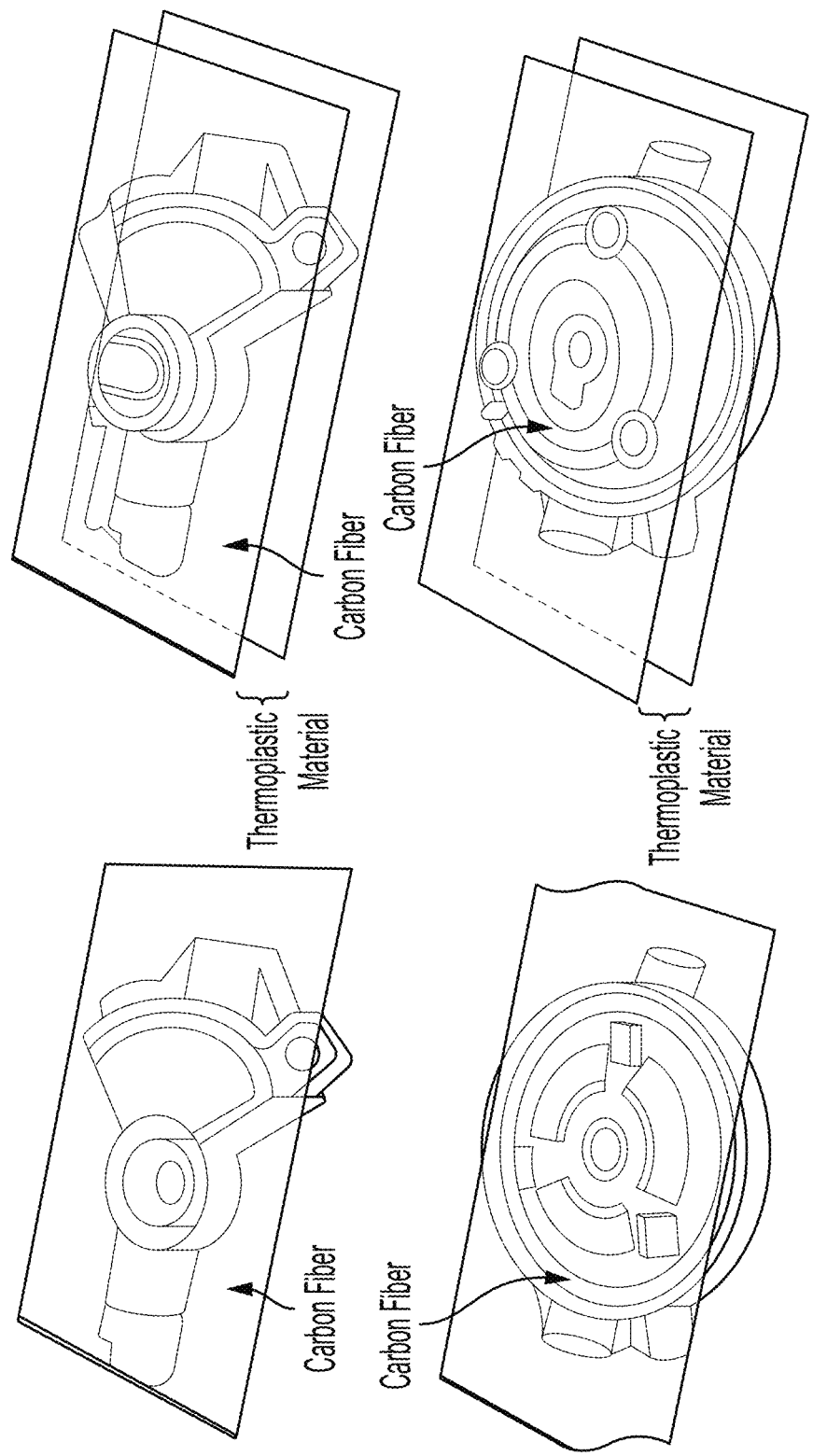
FIG. 8 shows actuator housing covered by carbon fiber layers.

By sandwiching 3D-printed thermoplastic material between layers of continuous carbon fiber (FIG. 8), weight can be reduced while stiffness is greatly increased. This approach is used for the 3D-printed actuator housings that will later be discussed in detail.

B. Monolithic Fabrication of High-Energy Density and Back-Derivable Actuators

As discussed below, actuators such as brushless DC motors and harmonic drive solutions are integrated in a monolithic fabrication fashion to achieve solutions that fit the objectives of maximum energy-density and minimum weight.

A harmonic drive transmission solution has advantages including backlash-free operation, small dimensions for a given durability and low weight, impressive gear ratios for back-derivability, reconfigurability inside a flexible housing, impressive resolution, good reliability, repeatability when repositioned inertial loads are involved, high torque output, and coaxial configurations. The component sets that are applied in the design of the actuators possess high gear reduction ratios in a small volume (e.g., a ratio from 30:1, 50:1 and 100:1). A comparison between the component sets and standard transmission gear-based solutions would reveal that large gear reductions are possible in the same space in which planetary gears typically only produce a limited ratio.

The components sets applied in these designs have three basic components: a wave generator, a flex spline, and a circular spline. A fourth component can be used to reduce the overall length or to enhance the overall gear reduction within a more compact design.

The wave generator is composed of two separate components: a disk with an elliptical shape called a wave generator plug and an outer ball bearing. The flex spline is shaped like a shallow cup with sides of the spline being very thin. This yields significant flexibility of the walls at the open end and in the closed side results in a rigid structure that can be tightly secured. Around the outside of the flex spline there are teeth and it fits tightly over the wave generator, and as such when the wave generator plug rotates, the resulting deformations on the flex spline do not slip over the outer elliptical ring of the ball bearing.

The circular spline and wave generator sandwich the flex spline open end and the input rotation is translated to the output ration on the flex spline closed end. The circular spline is a rigid circular ring with teeth on the inside. The flex spline and wave generator are placed inside the circular spline, meshing the teeth of the flex spline and the circular spline.

We applied a Markforged 3D printers to embed these component sets inside composite housings that are smartly designed and reinforced to withstand the internal and external force and deformations. These devices print primarily with Onyx, a composite of nylon and chopped carbon fibers, which is reinforced with continuous carbon fiber from a second extruder. The print bed of the printer can also be removed and replaced within 10 microns of accuracy, enabling embedding of components, which will be further discussed below. Together, these specifications make the printers key tools for producing extremely light and robust actuators.

Figure 9:
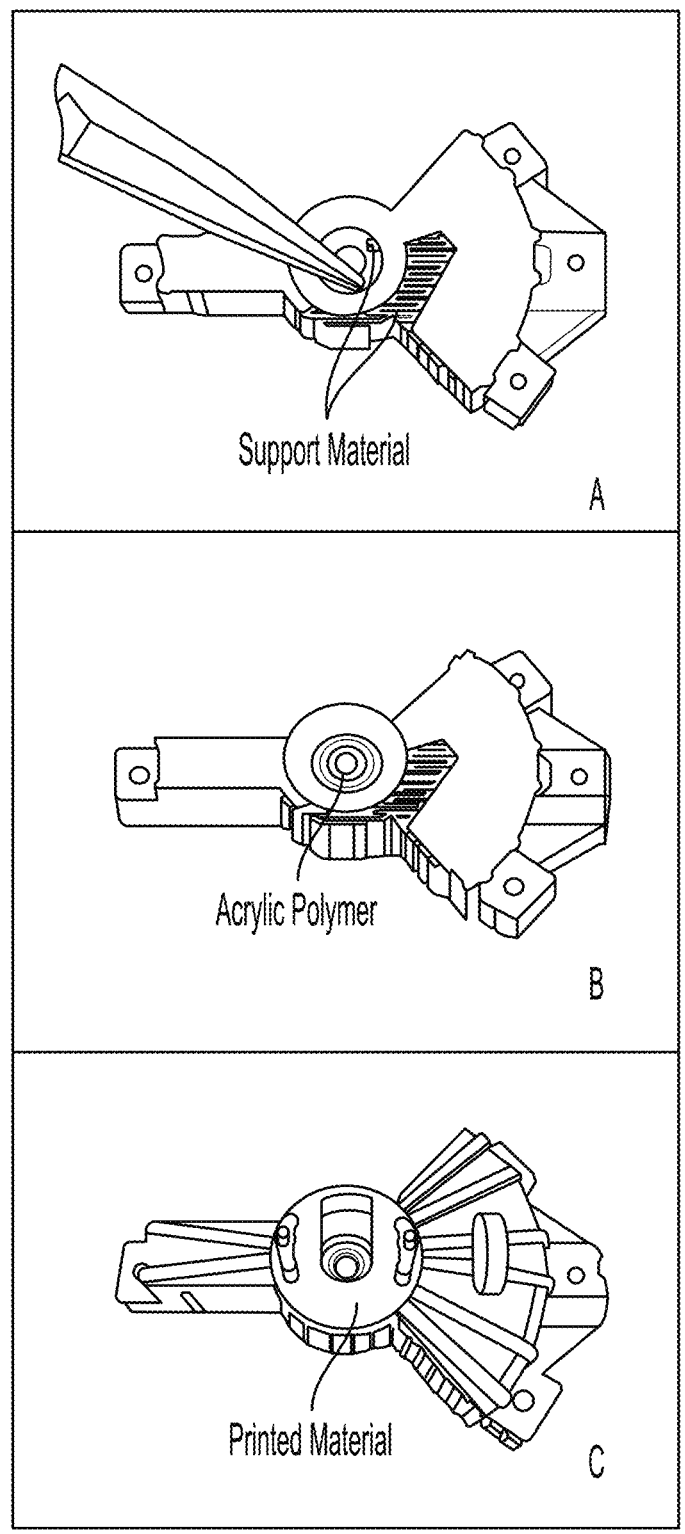
FIG. 9 illustrates the process of embedding an input bearing housing.

In order to eliminate or reduce the need for metal fasteners or other retaining hardware in these actuators, components such as bearings and harmonic drive circular splines are embedded during the composite additive manufacturing process. Pauses are planned so that the print bed can be removed mid-print to insert components. This process is outlined in FIG. 9, where the support material is removed (A), the component is inserted and coated in glue (B), and the print is resumed and completed (C).

Figure 10:
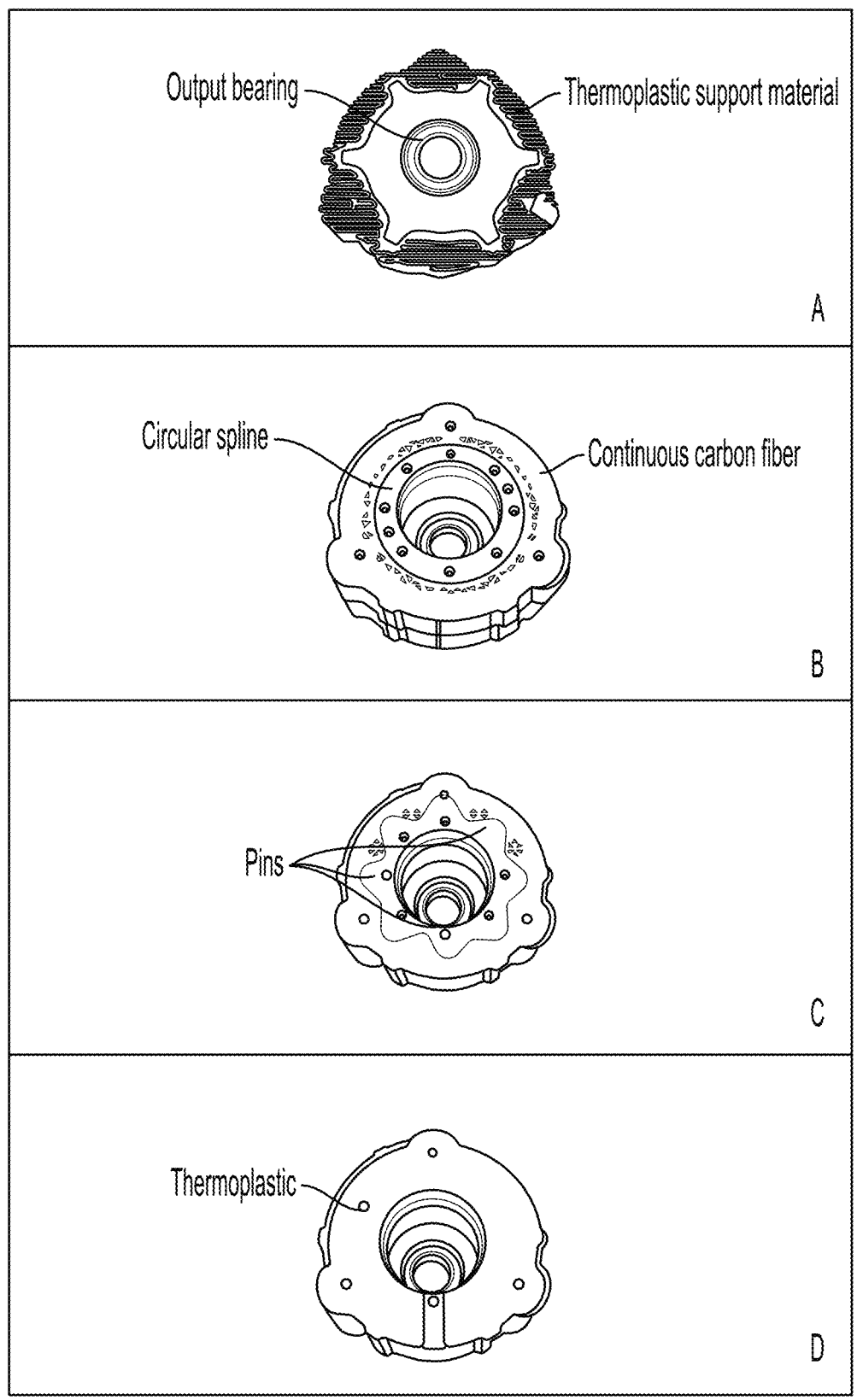
FIG. 10 illustrates the process of embedding a harmonic drive housing.

The process of embedding the output bearing of the actuator and a harmonic drive circular spline is shown in FIG. 10.

Figure 11:
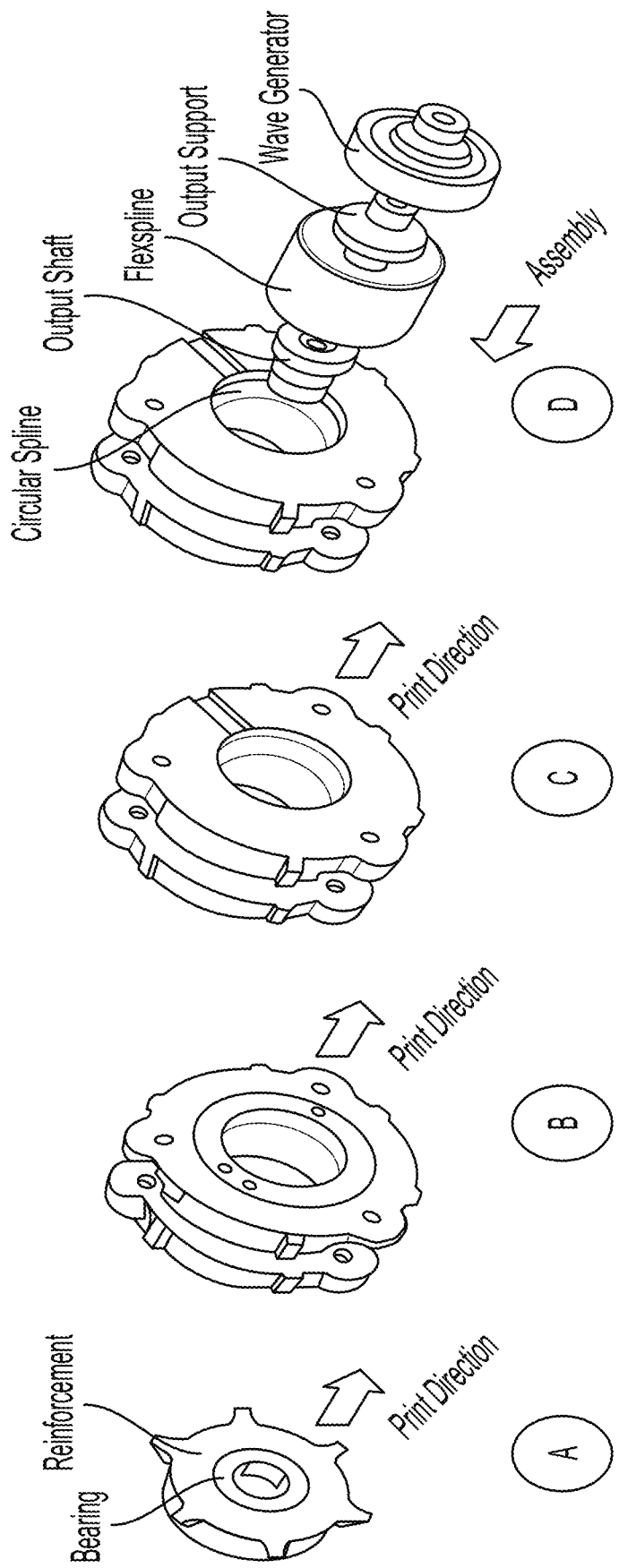
FIG. 11 illustrates the process of embedding components within composite structures through a carbon-fiber additive manufacturing process.
Figure 12:
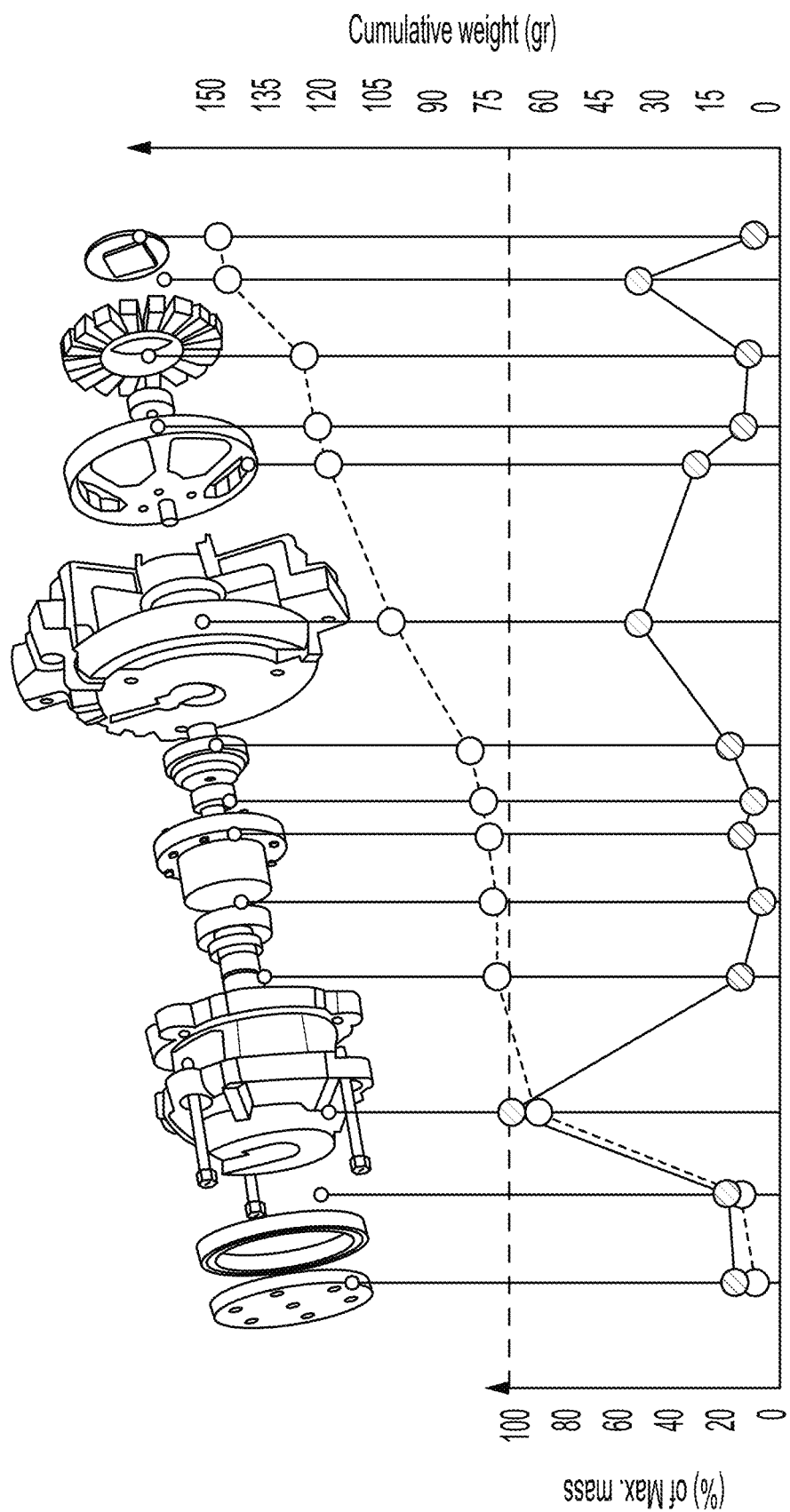
FIG. 12 is a graph illustrating component weights and cumulative actuator weight.
Figure 13:
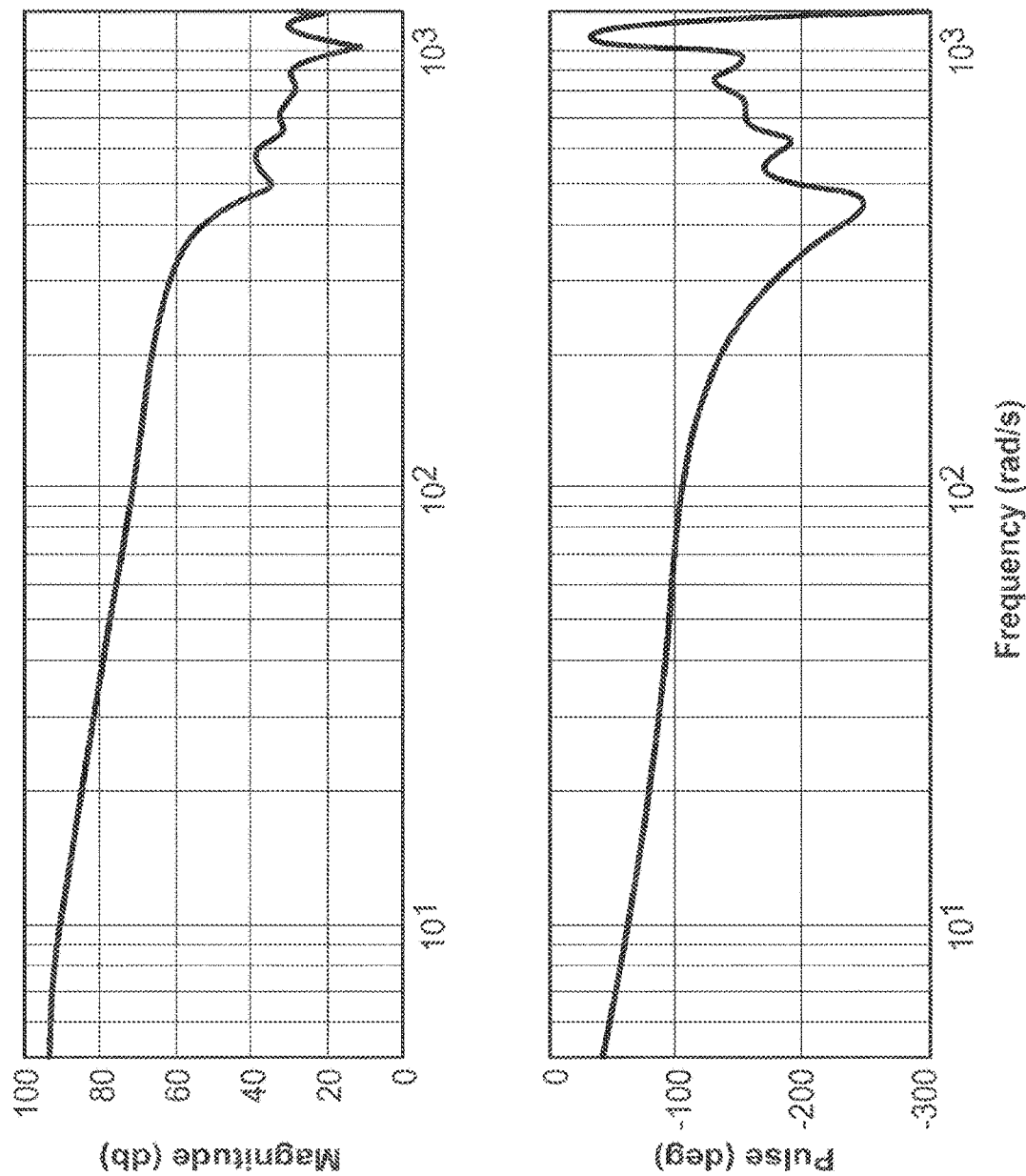
FIG. 13 shows graphs illustrating a motor only velocity bode plot.
Figure 14:
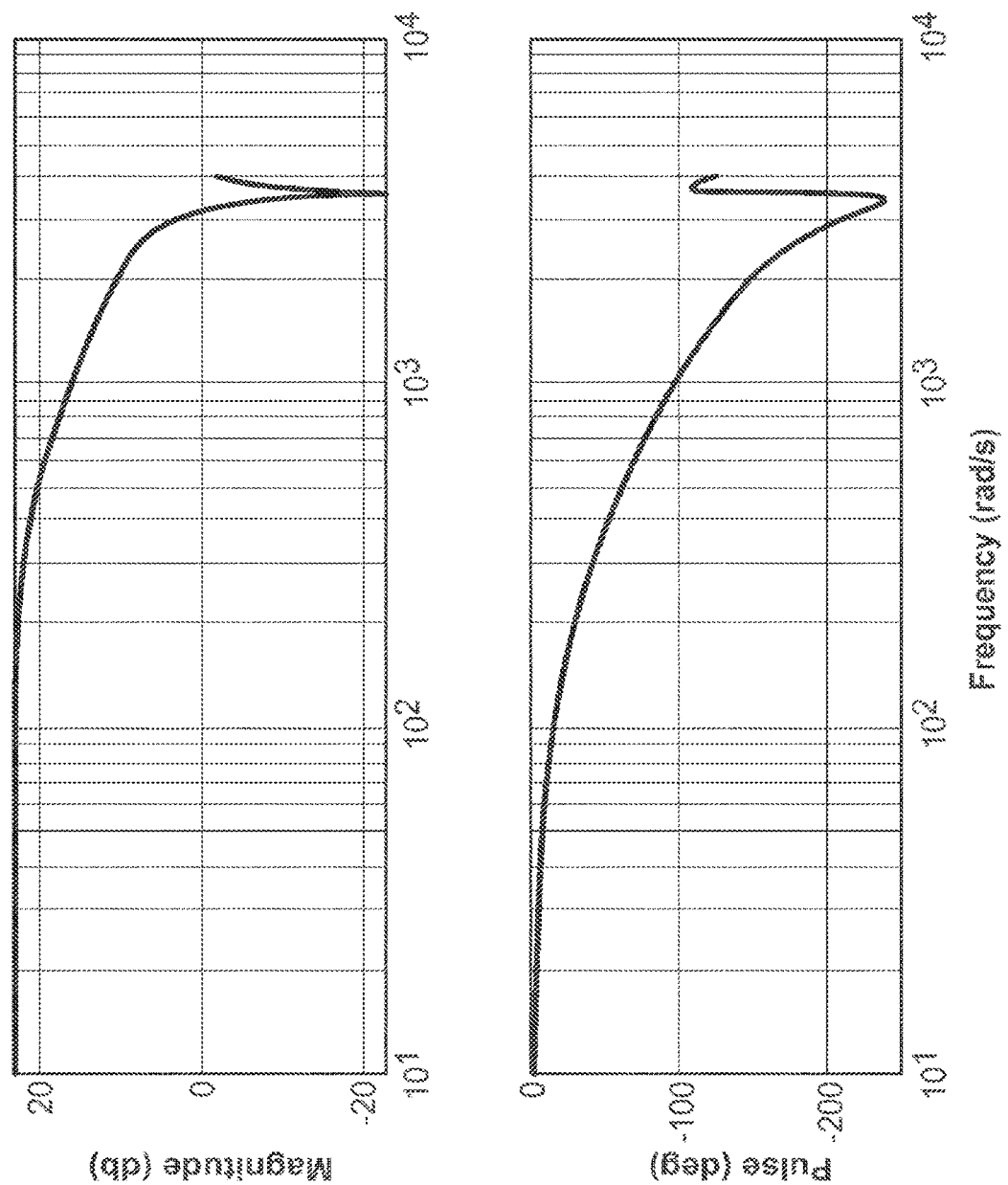
FIG. 14 shows graphs illustrating a motor only current bode plot.
Figure 15:
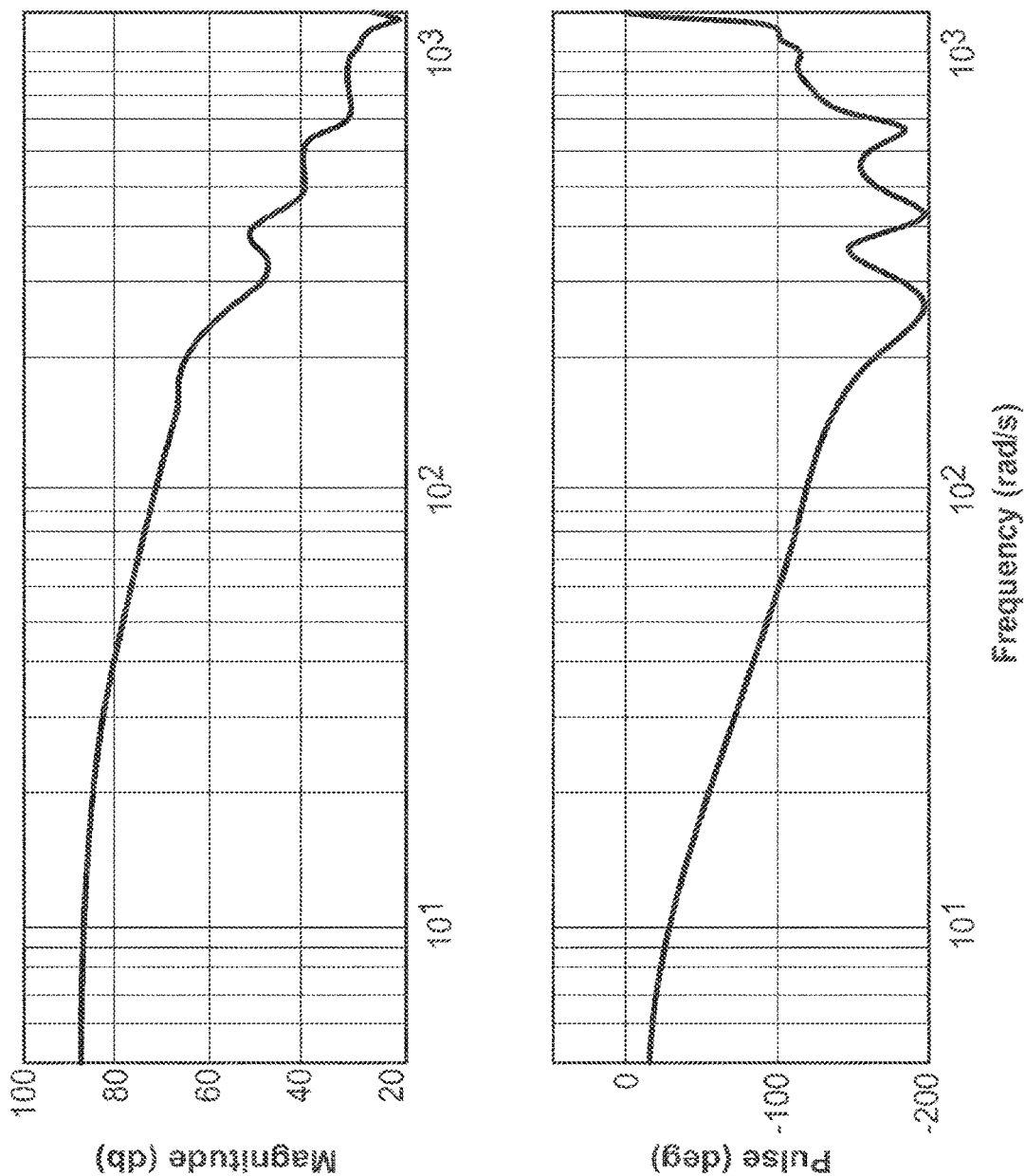
FIG. 15 shows graphs illustrating a harmonic drive velocity bode plot.
Figure 16:
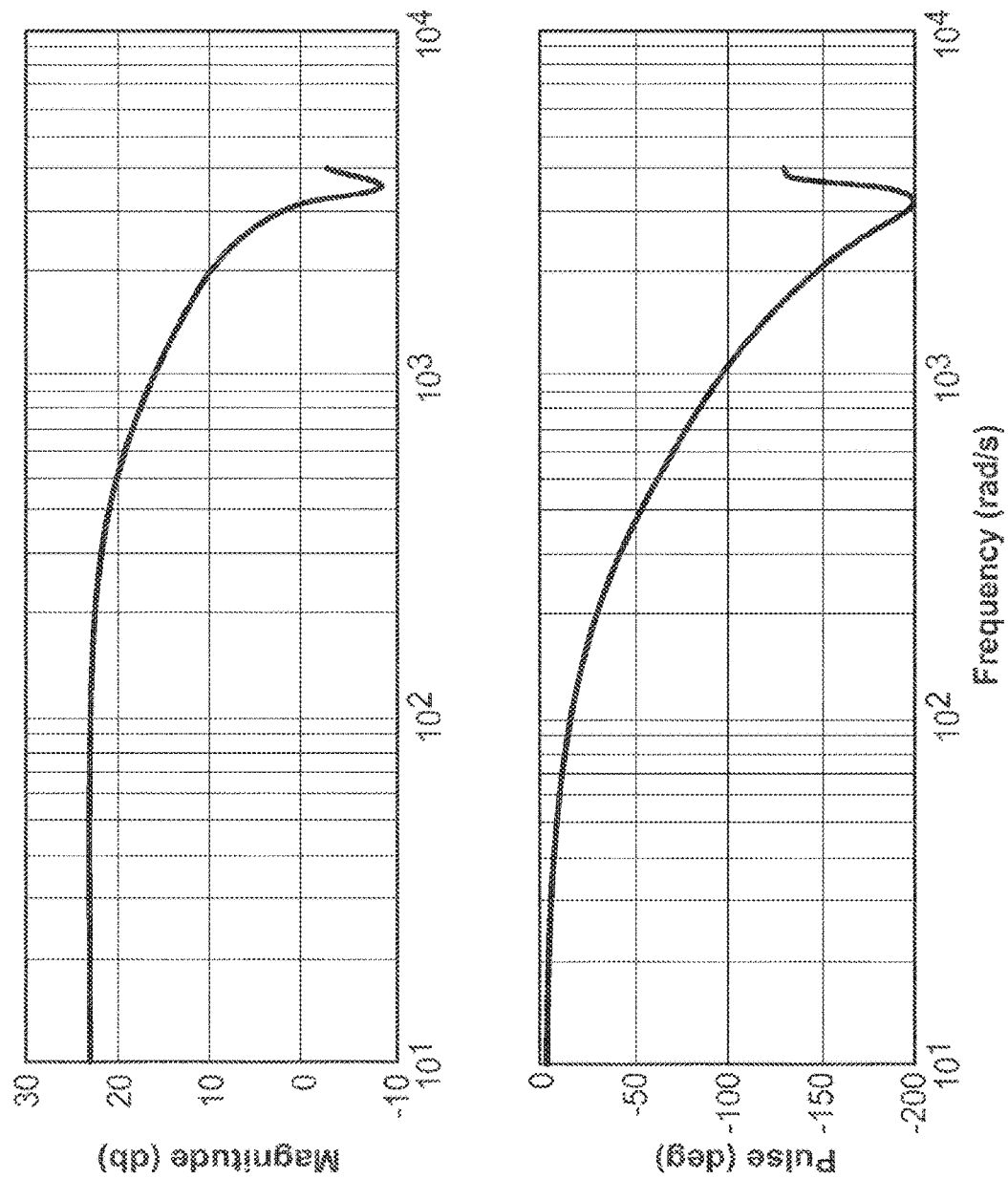
FIG. 16 shows graphs illustrating a harmonic drive current bode plot.

The output bearing is embedded during the first print pause (A), and the circular spline during the second (B). Three aluminum dowel pins are inserted through the housing and circular spline (C), and the print is completed with additional layers of onyx and carbon fiber over the pins (D). After the circular spline and flexible spline are coated in harmonic drive grease according to their specifications, the flexible spline and output support are inserted into the housing and fastened to the output shaft with a metal fastener. FIG. 11 further illustrates embedding process and the insertion of the output shaft, output support, and harmonic drive flexible spline and wave generator.

The coils of a T-motor Antigravity 4004 brushless DC motor are press-fit onto the 3D-printed housing and secured with a laser-cut carbon fiber key, which is cut from 1 mm thick carbon fiber stock with an LPKF ProtoLaser U4.

The LPKF ProtoLaser U4 leverages a highly versatile and accurate scanner-guided laser with a wavelength of 355 nm in the UV spectrum that has been specially developed for use in electronics laboratories. This wavelength makes it possible for many material groups to be perfectly processed with the laser without additional tools, masks or films. The laser cutter allows cutting extremely precise laser-cut components that can match the accuracy of the printer. Such an accuracy is important and key in the overall process of embedding components in that any discrepancy in the dimensions can lead to severe damages to the printer consumable nuzzle. Placing scan fields next to each other results in a working range of up to 229 mm by 305 mm by 10 mm. The laser focus with a diameter of approximately 20 µm. allows for structures with a pitch of 65 micron, i.e., 50 micron line width, 15 micron apart.

A custom shaft also is press-fit into the rotor of the motor and secured by set screws. Once the rotor and shaft assembly is pressed into the upper motor housing, the upper and lower motor housings can be fastened together with three screws and nuts. E-clips are used to secure both sides of the shaft. The harmonic drive wave generator is secured with set screws to the motor shaft and is then slowly pressed into the circular spline inside the harmonic drive housing.

Once assembled, the actuator was tested with an Elmo amplifier connected to a PC with Elmo Application Studio II and a power supply. A series of tests were run on the actuators, and the frequency response of the current and velocity identification tests on the actuator with and without the harmonic drive are shown in the bode plots in FIGS. 13-16.

Figure 17:
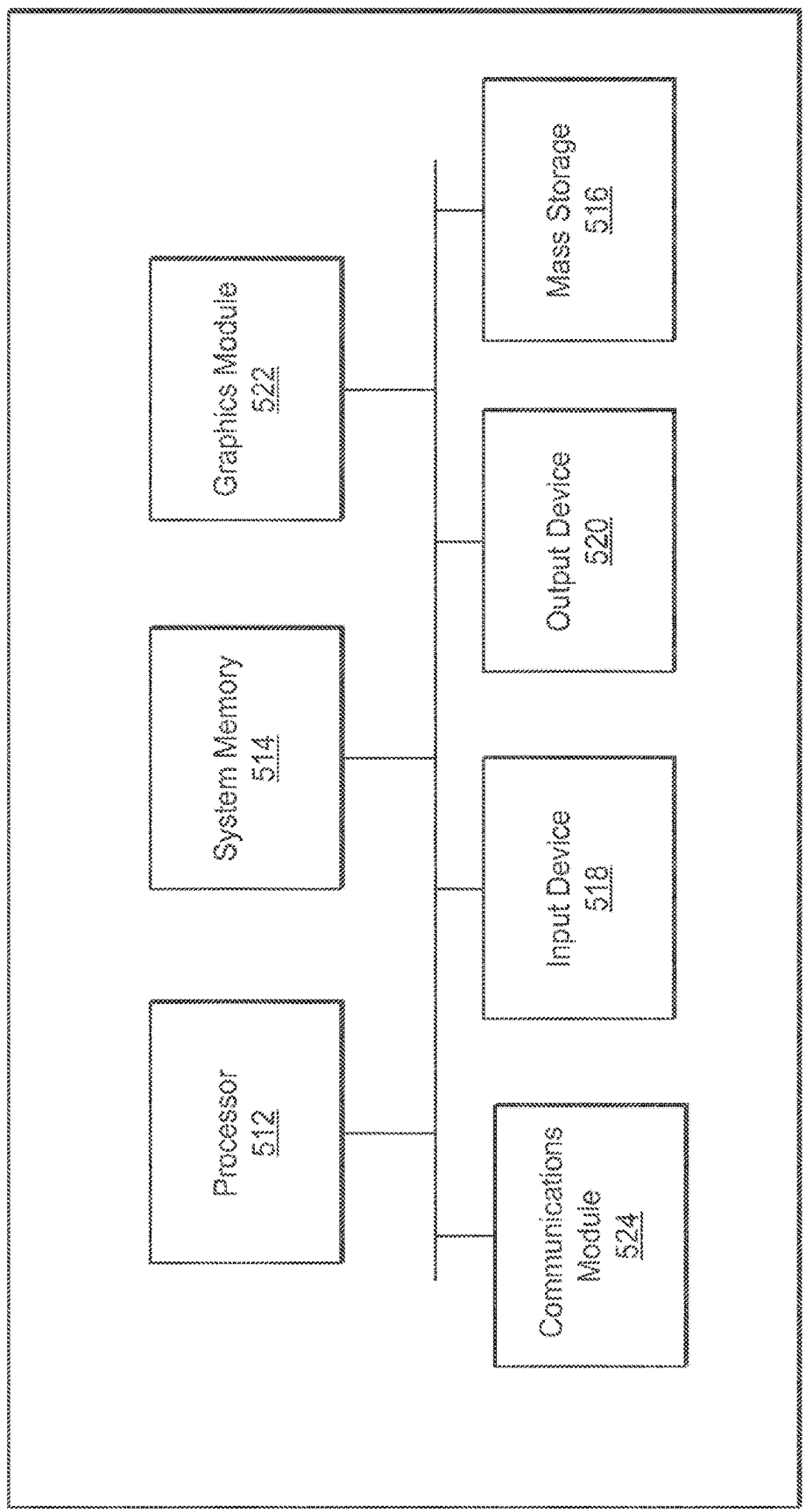
FIG. 17 is a simplified block diagram illustrating an exemplary computer system in which various processes described herein may be implemented.

The methods, operations, modules, and systems described herein particularly for locating and sizing robot components may be implemented in one or more computer programs executing on a programmable computer system. FIG. 17 is a simplified block diagram illustrating an exemplary computer system 510, on which the one or more computer programs may operate as a set of computer instructions. The computer system 510 includes, among other things, at least one computer processor 512, system memory 514 (including a random access memory and a read-only memory) readable by the processor 512. The computer system 510 also includes a mass storage device 516 (e.g., a hard disk drive, a solid-state storage device, an optical disk device, etc.). The computer processor 512 is capable of processing instructions stored in the system memory or mass storage device. The computer system additionally includes input/output devices 518, 520 (e.g., a display, keyboard, pointer device, etc.), a graphics module 522 for generating graphical objects, and a communication module or network interface 524, which manages communication with other devices via telecommunications and other networks.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

REFERENCES

[1] R. J. Lock, S. C. Burgess, and R. Vaidyanathan, "Multimodal locomotion: from animal to application," Bioinspiration & Biomimetics, vol. 9, no. 1, p. 011001, December 2013.

[2] A. Ramezani, J. W. Hurst, K. Akbari Hamed, and J. W. Grizzle, "Performance Analysis and Feedback Control of ATRIAS, A Three-Dimensional Bipedal Robot," Journal of Dynamic Systems, Measurement, and Control, vol. 136, no. 2, p. 021012, March 2014.

[3] P. M. Wensing, A. Wang, S. Seok, D. Otten, J. Lang, and S. Kim, "Proprioceptive Actuator Design in the MIT Cheetah: Impact Mitigation and High-Bandwidth Physical Interaction for Dynamic Legged Robots," IEEE Transactions on Robotics, vol. 33, no. 3, pp. 509-522, June 2017.

[4] S. Seok, A. Wang, M. Y. Chuah, D. J. Hyun, J. Lee, D. M. Otten, J. H. Lang, and S. Kim, "Design Principles for Energy-Efficient Legged Locomotion and Implementation on the MIT Cheetah Robot," IEEE/ASME Transactions on Mechatronics, vol. 20, no. 3, pp. 1117-1129, June 2015.

[5] N. Kashiri, A. Abate, S. J. Abram, A. Albu-Schaffer, P. J. Clary, M. A. Daley, S. Faraji, R. Furnemont, M. Garabini, H. Geyer, A. M. Grabowski, J. Hurst, J. Malzahn, G. Mathijssen, D. Remy, W. Roozing, M. Shahbazi, S. N. Simha, J.-B. Song, N. Smit-Anseeuw, S. Stramigioli, B. Vanderborght, Y. Yesilevskiy, and N. Tsagarakis, "An Overview on Principles for Energy Efficient Robot Locomotion," Frontiers in Robotics and AI, vol. 5, no. 129, December 2018.

[6] M. Hutter, C. Gehring, M. Bloesch, M. A. Hoepflinger, C. D. Remy, and R. Siegwart, "Starleth: a compliant quadrupedal robot for fast, efficient, and versatile locomotion," in Adaptive Mobile Robotics. WORLD SCIENTIFIC, May 2012, pp. 483-490.

[7] D. J. Hyun, S. Seok, J. Lee, and S. Kim, "High speed trot-running: Implementation of a hierarchical controller using proprioceptive impedance control on the MIT Cheetah," The International Journal of Robotics Research, vol. 33, no. 11, pp. 1417-1445, September 2014.

[8] M. Hutter, C. Gehring, D. Jud, A. Lauber, C. D. Bellicoso, V. Tsounis, J. Hwangbo, K. Bodie, P. Fankhauser, M. Bloesch, R. Diethelm, S. Bachmann, A. Melzer, and M. Hoepflinger, "ANYmal—a highly mobile and dynamic quadrupedal robot," in 2016 IEEE/RSJ International Conference on Intelligent Robots and Systems (IROS), October 2016, pp. 38-44.

[9] R. M. Alexander, Principles of Animal Locomotion. Princeton University Press, 2013.

[10] C. Dario Bellicoso, C. Gehring, J. Hwangbo, P. Fankhauser, and M. Hutter, "Perception-less terrain adaptation through whole body control and hierarchical optimization," in 2016 IEEE-RAS 16th International Conference on Humanoid Robots (Humanoids), November 2016, pp. 558-564.

[11] F. Farshidian, E. Jelavié, A. W. Winkler, and J. Buchli, "Robust whole-body motion control of legged robots," in 2017 IEEE/RSJ International Conference on Intelligent Robots and Systems (IROS), September 2017, pp. 4589-4596.

[12] N. Roy, P. Newman, and S. Srinivasa, "Hybrid Operational Space Control for Compliant Legged Systems," in Robotics: Science and Systems VIII. MITP, 2013, pp. 129-136.

[13] M. Hutter, C. D. Remy, M. A. Hoepflinger, and R. Siegwart, "Efficient and Versatile Locomotion With Highly Compliant Legs," IEEE/ASME Transactions on Mechatronics, vol. 18, no. 2, pp. 449-458, April 2013.

[14] W. Townsend and J. Salisbury, "Mechanical bandwidth as a guideline to high-performance manipulator design," in 1989 International Conference on Robotics and Automation Proceedings, May 1989, pp. 1390-1395 vol. 3.

[15] P. Fankhauser, M. Bjelonic, C. Dario Bellicoso, T. Miki, and M. Hutter, "Robust Rough-Terrain Locomotion with a Quadrupedal Robot," in 2018 IEEE International Conference on Robotics and Automation (ICRA), May 2018, pp. 5761-5768.

[16] A. W. Winkler, C. D. Bellicoso, M. Hutter, and J. Buchli, "Gait and Trajectory Optimization for Legged Systems Through Phase-Based End-Effector Parameterization," IEEE Robotics and Automation Letters, vol. 3, no. 3, pp. 1560-1567, July 2018.

[17] C. Mastalli, I. Havoutis, A. W. Winkler, D. G. Caldwell, and C. Semini, "On-line and on-board planning and perception for quadrupedal locomotion," in 2015 IEEE International Conference on Technologies for Practical Robot Applications (TePRA), May 2015, pp. 1-7.

[18] H. Kimura, Y. Fukuoka, and A. H. Cohen, "Adaptive Dynamic Walking of a Quadruped Robot on Natural Ground Based on Biological Concepts," The International Journal of Robotics Research, vol. 26, no. 5, pp. 475-490, May 2007.

[19] T. Apgar, P. Clary, K. Green, A. Fern, and J. Hurst, "Fast Online Trajectory Optimization for the Bipedal Robot Cassie," in Robotics: Science and Systems XIV, June 2018.

[20] S Chatterjee, B Roberts, and R Lind. Pterodrone, a pterodactyl-inspired unmanned air vehicle that flies, walks, climbs, and sails. WIT Transactions on Ecology and the Environment, 138:301-316, 2010.

[21] Ludovic Daler, Julien Lecoeur, Patrizia Bernadette Hählen, and Dario Floreano. A flying robot with adaptive morphology for multi-modal locomotion. In 2013 IEEE/RSJ International Conference on Intelligent Robots and Systems, pages 1361-1366. IEEE, 2013.

[22] James D Dickson and Jonathan E Clark. Design of a multimodal climbing and gliding robotic platform. IEEE/ASME Transactions On Mechatronics, 18(2):494-505, 2012.

[23] Markus Eich, Felix Grimminger, and Frank Kirchner. A versatile stair-climbing robot for search and rescue applications. In 2008 IEEE International Workshop on Safety, Security and Rescue Robotics, pages 35-40. IEEE, 2008.

[24] Navvab Kashiri, Lorenzo Baccelliere, Luca Muratore, Arturo Lau-renzi, Zeyu Ren, Enrico Mingo Hoffman, Malgorzata Kamedula, Giuseppe Francesco Rigano, Jorn Malzahn, Stefano Cordasco, et al. Centauro: A hybrid locomotion and high power resilient manipulation platform. IEEE Robotics and Automation Letters, 4(2):1595-1602, 2019.

[25] Yoo-Seok Kim, Gwang-Pil Jung, Haan Kim, Kyu-Jin Cho, and Chong-Nam Chu. Wheel transformer: A wheel-leg hybrid robot with passive transformable wheels. IEEE Transactions on Robotics, 30(6):1487-1498, 2014.

[26] Francois Michaud, Dominic Letourneau, Martin Arsenault, Yann Bergeron, Richard Cadrin, Frederic Gagnon, Marc-Antoine Legault, Mathieu Millette, Jean-Francois Pare, Marie-Christine Tremblay, et al. Multi-modal locomotion robotic platform using leg-track-wheel articulations. Autonomous Robots, 18(2):137-156, 2005.

[27] Shuan-Yu Shen, Cheng-Hsin Li, Chih-Chung Cheng, Jau-Ching Lu, Shao-Fan Wang, and Pei-Chun Lin. Design of a leg-wheel hybrid mobile platform. In 2009 IEEE/RSJ International Conference on Intelligent Robots and Systems, pages 4682-4687. IEEE, 2009.

[28] Kenjiro Tadakuma, Riichiro Tadakuma, Akira Maruyama, Eric Rohmer, Keiji Nagatani, Kazuya Yoshida, Aigo Ming, Makoto Shimojo, Mitsuru Higashimori, and Makoto Kaneko. Mechanical design of the wheel-leg hybrid mobile robot to realize a large wheel diameter. In 2010 IEEE/RSJ International Conference on Intelligent Robots and Systems, pages 3358-3365. IEEE, 2010.

The invention claimed is:

1. A multi-modal robot capable of legged and aerial locomotion, comprising:
    a body structure including a plurality of legs, each leg having a first embedded actuator on a proximal end of a first shaft forming a hip joint, the first shaft running from the hip joint and terminating at a second embedded actuator, the second embedded actuator at a knee joint on the leg, the leg further comprising a second shaft extending from the knee joint and terminating in a jointed ankle with a distal foot, each of the first and second embedded actuators comprising a housing, a brushless DC motor press-fit onto the housing, and a rotor and shaft assembly press-fit into the housing;
    a thruster attached at the hip joint of each leg; and
    the first and second actuator controlling movement of each leg, and embedded within composite housing structures in each leg, wherein said composite housing structures reinforced by layers of continuous carbon fiber material; and
    the first and second actuator controlling movement of each thruster.

2. The multi-modal robot of claim 1, wherein the composite housing structures are sandwiched between layers of the continuous carbon fiber material to increase stiffness of the composite housing structures.

3. The multi-modal robot of claim 1, wherein the layers of continuous carbon fiber material comprise 1 mm thick carbon fiber stock.

4. The multi-modal robot of claim 1, wherein the composite material comprises a composite of nylon and chopped carbon fibers.

5. The multi-modal robot of claim 1, wherein the actuators include one or more motors or harmonic drive devices.

6. The multi-modal robot of claim 5, wherein each harmonic drive device includes a wave generator, a flex spline, and a circular spline.

7. The multi-modal robot of claim 1, wherein the robot is quadrupedal legged.

8. The multi-modal robot of claim 1, further comprising a motor shaft.

* * * * *